UNITED STATES PATENT OFFICE.

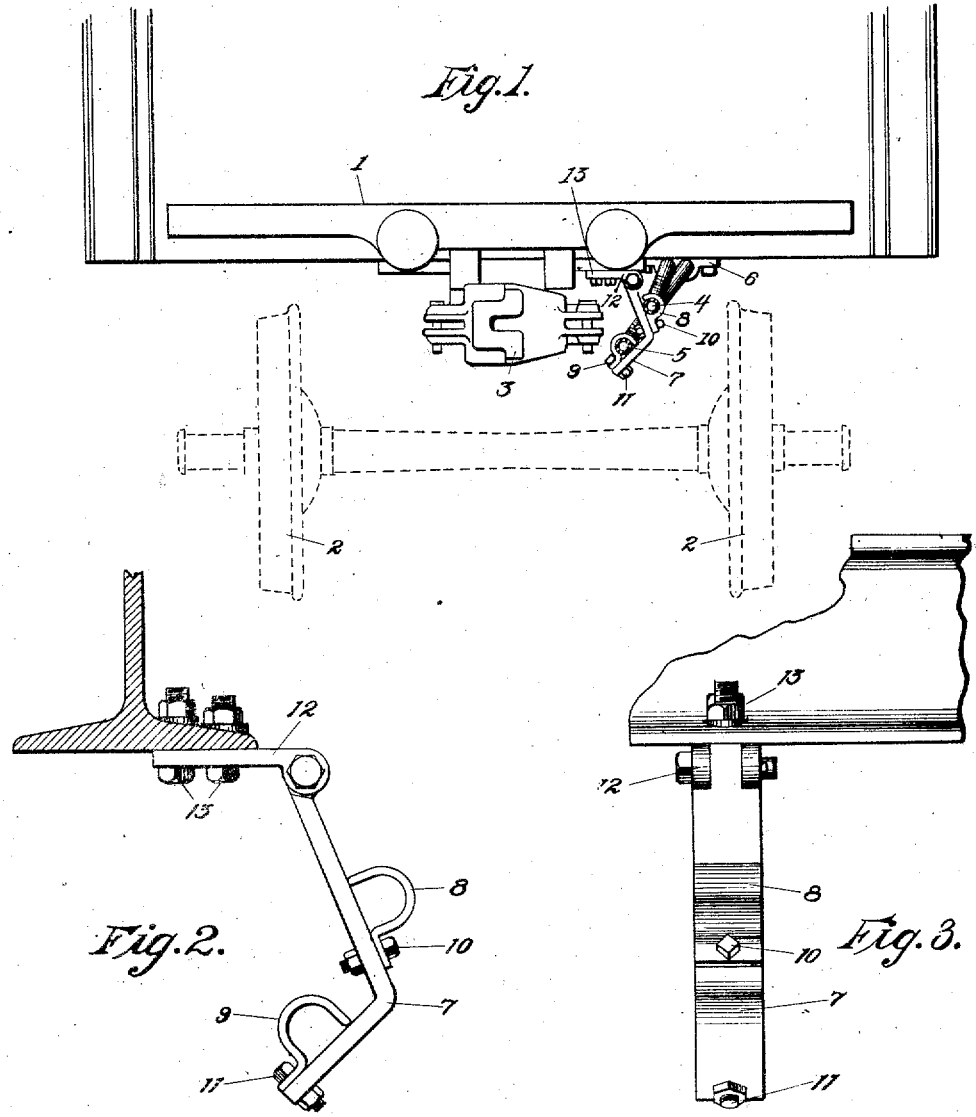

JAMES F. DRAKE, OF JERSEY CITY, NEW JERSEY, ASSIGNOR OF FOUR-FIFTHS TO WILLIAM L. BLISS, OF BROOKLYN, NEW YORK.

TRAIN-PIPE HANGER.

No. 888,791.  Specification of Letters Patent.  Patented May 26, 1908.

Application filed August 2, 1907. Serial No. 386,708.

*To all whom it may concern:*

Be it known that I, JAMES F. DRAKE, a citizen of the United States, residing at Jersey City, in the county of Hudson and State of New Jersey, have invented new and useful Improvements in Train-Pipe Hangers, of which the following is a full, clear, concise, and exact description, reference being had to the accompanying drawing, forming a part of this specification.

My invention relates to improvements in hangers for the brake, signal, steam and other pipes of railroad cars.

The cars of railroad trains are now equipped with pipes, which are connected from car to car by means of a hose and a hose coupling. There are several of these pipes upon a car, as for instance, a brake pipe, a steam pipe, and a signal pipe. For convenience of description, I shall refer to the brake pipe. The brake pipe extends from one end of the car to the other, and it is now held at each end by means of a rigid hanger. On each end of the brake pipe is a hose having a coupling member. Looking at the end of a car, the brake pipe is found at the right hand side of the center, along side of the car coupler. Intermediate of the ends of the car, this pipe is crossed over so that it will occupy the same position at each end of the car. The reason for arranging the brake pipe in this manner is so that its ends on two adjacent cars will always occupy the same relative position, and may be connected in the same manner, irrespective of which ends of the car abut. The brake pipes at the abutting ends of two adjacent cars are arranged on opposite sides of the center, and the hose connecting the same extends diagonally across the center and loops downwardly. The members of the hose coupling are adapted to become automatically detached if the hose straightens out, as would be the case if the cars become uncoupled and part.

When a train is going around a curve, the relative positions of the abutting ends of adjacent cars change. For instance, if one car is on the straight track and the other is on the curve, the abutting ends of these cars are out of alinement. If the curve is sharp the abutting ends of these two cars may be far out of alinement and in consequence the distance between the brake pipe of one car and those of the other may be so great that the hose connection will be straightened out sufficiently to disconnect the hose coupling.

The object of my invention is to provide means movably supporting the ends of the brake pipe, as well as other similar pipes.

In accordance with the preferred form of my invention, I provide means for movably supporting the ends of the brake pipe, whereby the ends of the brake pipe may follow the relative movement between the abutting ends of adjacent cars.

In order to more particularly explain my invention, I have illustrated one form thereof in the accompanying drawings, in which Figure 1 is an end view of a car, and Figs. 2 and 3 are front and side views of one form of hanger for the brake and signal pipes.

The car is provided with a body 1, wheels 2 and a coupler 3. Beneath the bottom of the car on the right hand side of the center are arranged two pipes 4 and 5. One of these pipes may be the brake pipe and the other the signal pipe. These pipes are fastened to the car body at some distance back from the end by means of a cleat or other means 6. The ends of the pipes are carried by means of a pivoted hanger 7. The hanger may be of a bar, the lower end of which is arranged at an angle to its upper portion. It is provided with cleats 8, and 9, one upon the upper portion, and the other upon the lower portion of the hanger. These cleats are held in position by means of bolts 10 and 11 and are arranged upon opposite sides of the hanger. The ends of the brake pipe and signal pipe are attached to the hanger by means of the cleats 8 and 9. The hanger is pivoted upon a bracket 12 which is fastened to the body of the car, preferably to one of the longitudinal beams of the car body, by means of bolts 13.

When the abutting ends of two cars are out of alinement, as is the case when a train is turning a curve, the hanger on each car allows the ends of the brake and signal pipes to move inwardly sufficiently to prevent the hose connection from being straightened out and the hose coupling disconnected.

The results that I obtain by my invention may be accomplished by various devices all of which fall within the scope of my invention, as defined in certain claims appended hereto.

Having thus described my invention what I claim as new and desire to secure by Letters Patent, is:

1. The combination with a car and a pipe carried thereon adapted to be connected to a similar pipe upon an adjacent car by means of a hose and coupling, of means for movably supporting the end of said pipe and permitting lateral movement thereof.

2. The combination with a car and pipes carried thereon adapted to be connected to similar pipes upon an adjacent car by means of hose and couplings, of means for movably supporting the ends of said pipes and permitting lateral movement thereof.

3. The combination with a car and a pipe carried thereon adapted to be connected to a similar pipe upon an adjacent car by means of a hose and coupling, of means supporting the end of said pipe and permitting movement thereof transversely of the car.

4. The combination with a car and a plurality of pipes carried thereon adapted to be connected to similar pipes upon an adjacent car by means of hose and couplings, of means for supporting the ends of said pipes and permitting movement thereof transversely of the car.

5. The combination with a car and a pipe carried thereon adapted to be connected to a similar pipe upon an adjacent car by means of a hose and coupling, of means movable transversely of said car for supporting said pipe.

6. The combination with a car and a plurality of pipes carried thereon adapted to be connected to similar pipes upon an adjacent car by means of hose and couplings, of means movable transversely of said car for supporting the ends of said pipes.

7. The combination with a car and a pipe carried thereon adapted to be connected to a similar pipe upon an adjacent car by means of a hose and coupling, of a supporting member for the end of said pipe carried by said car and movable transversely thereon.

8. The combination with a car and a plurality of pipes carried thereon adapted to be connected to similar pipes upon an adjacent car by means of hose and couplings of a supporting member for all of said pipes carried by said car and movable transversely thereof.

9. The combination with a car and a plurality of pipes carried thereon adapted to be connected to similar pipes upon an adjacent car by means of hose and couplings of a single member carried by said car and movable transversely thereof, and means for securing the ends of all of said pipes to said movable member.

10. The combination with a car and a pipe extending from end to end and adapted to be connected to a similar pipe upon an adjacent car by means of a hose and coupling, of a pivoted hanger for movably supporting the end of said pipe.

11. The combination with a car and pipes extending from end to end and adapted to be connected to similar pipes upon an adjacent car by means of hose and couplings, of a pivoted hanger for movably supporting the ends of said pipes.

12. The combination of a car and a pipe arranged thereon and adapted to be connected to a similar pipe upon an adjacent car by means of a hose and coupling, of a hanger for movably supporting the end of said pipe and pivotally mounted upon a bracket attached to said car.

13. The combination with a car and pipes extending from one end to the other of said car and adapted to be connected to similar pipes on an adjacent car by means of hose and couplings, of a hanger for movably supporting the ends of said pipe, said hanger comprising a bar having one portion extending at an angle to the other portion, said pipes being attached to said hanger one to each of said portions.

14. The combination with a car having two or more pipes thereon adapted to be connected to similar pipes upon another car by means of hose and couplings, of a hanger for movably supporting said pipes, said pipes being attached to opposite sides of said hanger.

15. The combination with a car having two or more pipes extending from end to end and adapted to be connected to similar pipes upon an adjacent car by means of a hose and coupling of a pivoted hanger for movably supporting the ends of said pipes, said pipes being arranged on opposite sides of said hanger and said hanger having its lower portion arranged at an angle to its upper portion.

16. The combination with a car having pipes extending from end to end and adapted to be connected to similar pipes upon another car by means of hose and couplings, of a pivoted hanger for movably supporting the ends of said pipes, and cleats for attaching the ends of said pipes to said hanger.

In witness whereof, I have hereunto subscribed my name in the presence of two witnesses.

JAMES F. DRAKE.

Witnesses:
W. L. BLISS,
S. R. TERRY.